United States Patent
Haubs et al.

(10) Patent No.: US 7,812,110 B2
(45) Date of Patent: Oct. 12, 2010

(54) PROCESS FOR PREPARATION OF OXYMETHYLENE POLYMERS, SELECTED POLYMERS, AND THEIR USE

(75) Inventors: Michael Haubs, Bad Kreuznach (DE); Joachim Clauss, Darmstadt-Eberstadt (DE); Michael Hoffmockel, Niedernhausen (DE); Jürgen Lingnau, Mainz (DE); Arnold Schneller, Seeheim-Jugenheim (DE)

(73) Assignee: Ticona GmbH, Kelsterbach (DE)

( * ) Notice: Subject to any disclaimer, the term of this patent is extended or adjusted under 35 U.S.C. 154(b) by 794 days.

(21) Appl. No.: 11/643,131

(22) Filed: Dec. 21, 2006

(65) Prior Publication Data

US 2007/0179273 A1    Aug. 2, 2007

Related U.S. Application Data

(60) Provisional application No. 60/765,028, filed on Feb. 3, 2006.

(30) Foreign Application Priority Data

Dec. 24, 2005    (DE) .................. 10 2005 062 326

(51) Int. Cl.
    *C08G 12/00* (2006.01)
(52) U.S. Cl. .................. 528/230; 528/425
(58) Field of Classification Search .......... 528/230, 528/425
    See application file for complete search history.

(56) References Cited

U.S. PATENT DOCUMENTS

| | | | |
|---|---|---|---|
| 3,161,616 A | 12/1964 | Brown et al. | |
| 3,269,988 A | 8/1966 | Braude et al. | |
| 3,288,757 A | 11/1966 | Wilson et al. | |
| 3,393,179 A | 7/1968 | Leverett | |
| 3,998,791 A | 12/1976 | Radici et al. | |
| 4,097,453 A | 6/1978 | Radici et al. | |
| 4,158,091 A | 6/1979 | Radici et al. | |
| 4,220,740 A | 9/1980 | Matsuzaki et al. | |
| 4,339,569 A | 7/1982 | Sugio et al. | |
| 4,431,794 A | 2/1984 | Sadlowski et al. | |
| 4,788,258 A | 11/1988 | Collins et al. | |
| 5,587,449 A * | 12/1996 | Fleischer et al. | 528/232 |
| 6,576,740 B1 | 6/2003 | Chin et al. | |
| 2004/0097691 A1* | 5/2004 | Muck et al. | 528/230 |

FOREIGN PATENT DOCUMENTS

| | | |
|---|---|---|
| DE | 524440 | 5/1931 |
| DE | 1158709 | 12/1963 |
| DE | 1445255 | 11/1968 |
| DE | 3018898 | 11/1980 |
| DE | 4436107 G | 4/1996 |
| EP | 80656 | 6/1983 |

(Continued)

*Primary Examiner*—Randy Gulakowski
*Assistant Examiner*—Shane Fang
(74) *Attorney, Agent, or Firm*—Dority & Manning, P.A.

(57) ABSTRACT

A process is described for preparation of oxymethylene homo- and copolymers. This encompasses heterogeneous polymerization of a monomer which forms oxymethylene groups in the presence of an acetal of formaldehyde and of an initiator for cationic polymerization, followed by the deactivation of the polymer in a homogeneous phase via treatment with a basic aprotic solvent or with an aprotic solvent which comprises a base. Oxymethylene homopolymers with very high stability are also described.

16 Claims, 1 Drawing Sheet

FOREIGN PATENT DOCUMENTS

| | | |
|---|---|---|
| EP | 308186 | 3/1989 |
| EP | 1200500 | 5/2002 |
| GB | 1009884 | 11/1965 |
| GB | 1040171 | 8/1966 |
| GB | 1 524 410 | 9/1978 |
| GB | 1524410 | 9/1978 |
| JP | 57/080414 | 5/1982 |
| JP | 62/267311 | 11/1987 |
| JP | 04/114003 | 4/1992 |
| JP | 04/145114 | 5/1992 |
| JP | 2000/290334 | 10/2000 |
| JP | 2000/290336 | 10/2000 |

* cited by examiner

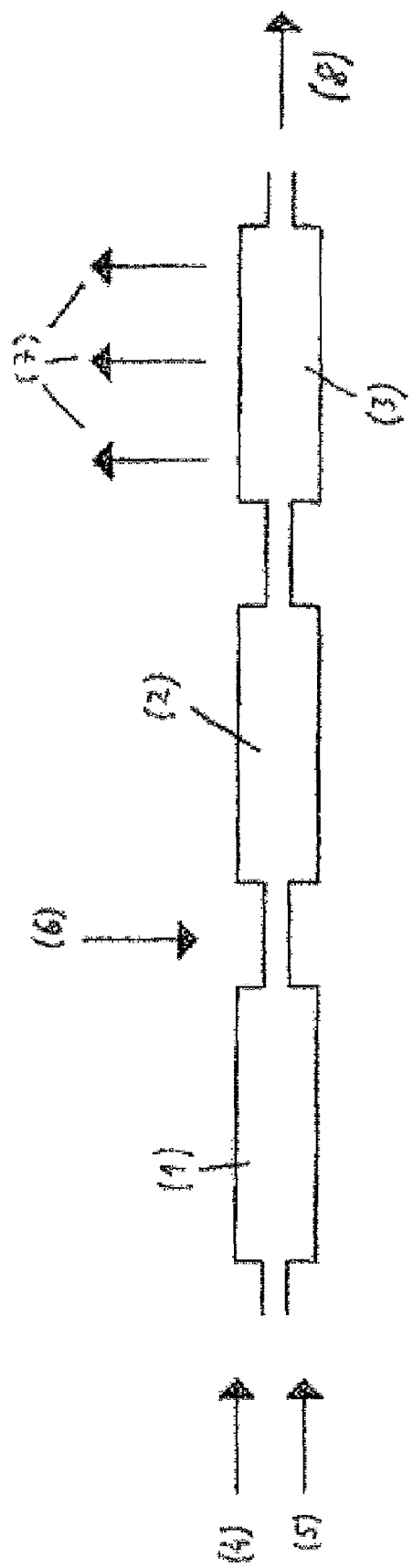

PROCESS FOR PREPARATION OF OXYMETHYLENE POLYMERS, SELECTED POLYMERS, AND THEIR USE

CROSS-REFERENCE TO RELATED APPLICATION

The present application claims benefit to us provisional application Ser. No. 60/765,028, filed Feb. 3, 2006 and German application no. DE 2005 062 326.3 filed Dec. 24, 2005.

The present invention relates to an improved process for preparation of oxymethylene homo- and copolymers, and also to selected oxymethylene homo- and copolymers and their use.

The preparation of polyoxymethylenes is known per se. The polymerization can take place either in bulk or else in solution as a precipitation polymerization, either at atmospheric pressure or at superatmospheric pressure. Chain-transfer agents, such as methylal, have also previously been used for preparation of oxymethylene polymers.

The cationically initiated variant of the polymerization uses cationic initiators. A disadvantage with the use of cationic initiators is that these also catalyze the reverse reaction, i.e. the degradation of POM to give formaldehyde. The reaction mixture therefore has to be deactivated after the polymerization.

A very wide variety of processes has previously been disclosed for deactivation of reaction mixtures. These can be divided into processes in which the polymer melt is treated with a basic deactivator and processes in which protic compounds such as methanol are used.

The polymerization and depolymerization of oxymethylene polymers are very rapid reactions. Deactivation of active constituents in the reaction mixture therefore has to take place rapidly and very completely, in order to minimize degradation of the polymer produced. In the case of deactivation in the polymer melt, the viscosity restricts the speed of mixing to incorporate the deactivator. Although viscosity can be raised via temperature increase, this also increases the rate of polymer degradation. In the case of deactivation with protic compounds, chain cleavage takes place at elevated temperatures, for example via a hydrogen transfer reaction.

Solutions of bases in nonprotic liquids, for example in acetone, have been used for deactivation of the polymerization mixture during synthesis of oxymethylene homo- and copolymers. In this case, either the polymerization mixture has been milled and then introduced into the solution of base in nonprotic liquid or the grinding itself has taken place in the presence of the base/liquid solution mentioned. However, the base/liquid solution does not dissolve the oxymethylene polymer. Instead, a suspension is obtained of finely milled oxymethylene polymer in this solution. Here again, the problem of insufficient, or insufficiently rapid, deactivation of the polymer arises.

Examples of the deactivation processes described above are described in DE-A-44 36 107, U.S. Pat. No. 3,269,988, EP-B-1,200,500, DE-A-30 18 898, EP-A-80,656, JP-A-62/267,311, JP-A-2000/290,334, JP-A-2000/290,336, GB-A-1,524,410, GB-A-1,040,171, and JP-A-57/080,414.

JP-A-04/114,003 and JP-A-04/145,114 describe the deactivation of the polymerization catalyst in oxymethylene homo- or copolymer mixtures via addition of mixtures of selected oxides and melting of the mixture.

It has long been known that the stability of oxymethylene polymers can be increased via capping of the end groups, for example via introduction of ether end groups or of ester end groups. Examples of this are found in DE-B-1,158,709, U.S. Pat. No. 3,998,791, U.S. Pat. No. 3,393,179, DE-A-1,445,255, DE-B-1,158,709, U.S. Pat. No. 4,097,453, and U.S. Pat. No. 3,161,616.

Whereas oxymethylene polymers capped with ester end groups are degraded in basic or acidic environments or at elevated temperatures, oxymethylene polymers capped with ether end groups feature very high stability. However, the processes proposed hitherto for preparation of these polymers have always encompassed a separate step for capping of the polymers. Although this separate reaction leads to markedly raised stability of the polymers, further improvements are nevertheless desirable, since the intention is that formaldehyde emission during further processing and application be minimized and if possible entirely eliminated.

There is moreover a continuing requirement for improved preparation processes in order to counter the omnipresent cost pressure.

It is an object of the present invention to provide a simple process for preparation of high-stability oxymethylene homo- or copolymers (hereinafter also termed POM), permitting efficient deactivation of the reaction mixture.

Another object of the present invention is provision of a process which can prepare high-stability POM and which can be carried out using simple means and at low energy cost.

Yet another object of the present invention is provision of selected oxymethylene homo- and copolymers which feature very high stability.

Surprisingly, it has now been found that use of selected chain-transfer agents during the polymerization and deactivation of the reaction mixture via treatment with selected deactivators in a homogeneous phase can be a simple method of producing high-stability POM.

The present invention provides a process for preparation of oxymethylene homopolymers of the formula I

$$R^1-(O-CH_2)_n-O-R^2 \quad (I)$$

in which $R^1$ and $R^2$, independently of one another, are alkyl radicals, and n is a whole number greater than or equal to 500, encompassing the following measures:

i) heterogeneous polymerization, in the presence of an acetal of formaldehyde and of an initiator for cationic polymerization, of a monomer which forms —CH$_2$—O— units, and ii) deactivation of the initiator and/or of the active polymer chains by using, for treatment in a homogeneous phase of the polymer prepared in step i), an aprotic solvent which is basic and/or which comprises a dissolved base.

Another embodiment of the invention provides a process for preparation of oxymethylene copolymers containing the structural units of the formulae II and III, and also end groups of the formula IV

$$-(O-CH_2)_m- \quad (II),$$

$$-O-C_oH_{2o}- \quad (III),$$

$$-OR^1 \quad (IV)$$

or containing the structural units of the formulae II and V, and, if appropriate, IV, and also end groups of the formula IV

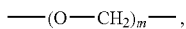 (II)

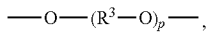 (V)

 (IV)

in which $R^1$ is an alkyl radical,
m is a whole number from 1 to 1000,
o is a whole number from 2 to 6,
p is a whole number from 3 to 6, and
$R^3$ is a p-valent organic radical encompassing the following measures:
  iii) heterogeneous polymerization of a monomer which forms —$CH_2$—O— units and simultaneously of a monomer which forms —O—$C_oH_{2o}$— units, in the presence of an acetal of formaldehyde and of an initiator for cationic polymerization, or heterogeneous polymerization of a monomer which forms —$CH_2$—O— units and simultaneously of a monomer which forms —O—$(R^3$—O$)_p$— units and, if appropriate, simultaneously of a monomer which forms —O—$C_oH_{2o}$— units, in the presence of an acetal of formaldehyde and of an initiator for cationic polymerization, and
  iv) deactivation of the initiator and/or of the active polymer chains by using an aprotic solvent which is basic and/or which comprises a dissolved base, for treatment in a homogeneous phase of the polymer prepared in step i).

$R^1$ and $R^2$ are, independently of one another, alkyl radicals, in particular $C_1$-$C_6$-alkyl radicals, which are preferably straight-chain radicals. It is very particularly preferable that $R^1$ and $R^2$ are, independently of one another, methyl, ethyl, propyl or butyl.

$R^3$ is derived from a branching agent. Examples of branching agents used are tri- or polyhydric alcohols or their derivatives, preferably tri- to hexahydric alcohols or their derivatives. Preferred derivatives are formals in which, in each case, two OH groups have been reacted with formaldehyde, and also epoxides. $R^3$ can thus be a p-valent organic radical, preferably a p-valent alkyl radical, e.g. a trivalent radical of the formula —$CH_2$—CH(R'—)—, in which R' is alkylene, such as methylene or ethylene.

Index n is preferably from 500 to 10 000, in particular from 500 to 3000.

Index m is preferably from 1 to 300.

Index o is preferably from 2 to 4, in particular 2.

Index p is preferably from 3 to 4.

Step i) of the inventive process involves a polymerization known per se of monomers which form —$CH_2$—O— units and, if appropriate, of other comonomers and/or branching agents. The polymerization takes place heterogeneously, i.e. in the presence of liquid and solid phase, preferably in the form of a precipitation polymerization.

For this, a monomer which forms —$CH_2$—O— units or a mixture of various monomers is reacted with conventional initiators of cationic polymerization and with acetals of formaldehyde as regulator in a manner known per se. The polymerization can take place at atmospheric pressure or preferably at pressures of up to 500 bar, for example at pressures of from 2 to 500 bar.

The polymerization temperature is below the melting point of the resultant homo- or copolymer.

Typical polymerization temperatures for the precipitation polymerization vary in the range from 60 to 140° C., preferably from 70 to 120° C. Preferred pressures for the precipitation polymerization vary in the range from 0 to 10 bar.

For preparation of the oxymethylene homo- or copolymers, a monomer which forms —$CH_2$—O— units or a mixture of various monomers is reacted in the manner described above.

The oxymethylene homo- or copolymers generally involve unbranched linear polymers which generally contain at least 50 mol %, preferably at least 80 mol %, in particular at least 90 mol %, of oxymethylene units (—$CH_2$—O—). If desired, small amounts of branching agent can be used. The amount of branching agents is usually not more than 1% by weight, based on the total amount of monomer used for preparation of the oxymethylene homo- or copolymers, preferably not being more than 0.3% by weight.

The molecular weights, characterized as volume melt index MVR, of these polymers can vary widely. MVR values are typically from 0.1 to 100 ml/10 min, preferably from 1 to 80 ml/10 min, measured to EN ISO 1133 at 190° C. with a load of 2.16 kg.

Oxymethylene homopolymers derive from formaldehyde or from its cyclic oligomers, such as trioxane or tetroxane.

Oxymethylene copolymers derive from formaldehyde or from its cyclic oligomers, particularly from trioxane, and from cyclic ethers, aldehydes, such as glyoxylic esters, cyclic acetals, which may have substitution if appropriate, and/or linear oligo- or polyacetals.

Merely by way of example, mention may be made of ethylene oxide, propylene 1,2-oxide, butylenes 1,2-oxide, butylenes 1,3-oxide, 1,3-dioxane, 1,3-dioxolane, 1,3-dioxepan and 1,3,6-trioxocane as cyclic ethers, and also linear oligo- or polyformals, such as polydioxolane or polydioxepan, as co-components.

It is preferable to prepare oxymethylene homopolymers in which at least 90%, preferably at least 95%, and very particularly preferably at least 98%, of all of the end groups are alkyl ether groups, in particular methoxy or ethoxy groups. Oxymethylene homopolymers prepared with very particular preference derive from trioxane.

Copolymers prepared with preference contain from 99.9 to 85 mol % of structural units of the formula —$(CH_2$—O—$)_m$, preferably derived from trioxane, and from 0.1 to 15 mol % of repeat structural units derived from one of the abovementioned comonomers, in particular —$CH_2$—$CH_2$—O— units.

Other oxymethylene copolymers that can be prepared are polymers having repeat structural units which are prepared by way of example via reaction of trioxane, of one of the cyclic ethers described above, and of a third monomer, preferably of a bifunctional compound of the formula

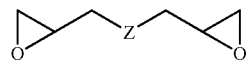

where Z is a chemical bond, —O— or —O—$R^4$—O— ($R^4$=$C_2$-$C_8$-alkylene or $C_2$-$C_8$-cycloalkylene).

Preferred monomers of this type are ethylene diglycide, diglycidyl ether and diethers composed of glycidyl moieties and formaldehyde, dioxane or trioxane in a molar ratio of 2:1, and also diethers composed of 2 mol of glycidyl compound and 1 mol of an aliphatic diol having from 2 to 8 carbon atoms, e.g. the diglycidyl ethers of ethylene glycol, 1,4-butanediol, 1,3-butanediol, 1,3-cyclobutanediol, 1,2-propanediol and 1,4-cyclo-hexanediol, to mention just a few examples.

Similarly, it is also possible to use a trifunctional compound as third monomer, e.g. the triglycidyl ether of trimethylolpropane.

Particularly preferred monomers which form —CH$_2$—O— units are formaldehyde or, very particularly preferably, trioxane.

In the heterogeneous-phase polymerization, the resultant polymer precipitates from the initially liquid polymerization mixture.

The molecular weight of the resultant (co)polymers is adjusted via use of acetals of formaldehyde (chain-transfer agents). These also lead to production of alkyl ether end groups in the (co)polymer, with the result that there is no need for a separate reaction with capping reagents.

Chain-transfer agents used comprise monomeric or oligomeric acetals of formaldehyde.

Preferred chain-transfer agents are compounds of the formula VI

(VI)

in which R$^1$ and R$^2$, independently of one another, are alkyl radicals, such as butyl, propyl, ethyl and in particular methyl, and q is a whole number from 1 to 100.

Particularly preferred chain-transfer agents are compounds of the formula VI in which q=1, and methylal is very particularly preferred.

The amounts usually used of the chain-transfer agents are up to 50 000 ppm, preferably from 100 to 5000 ppm, particularly preferably from 500 to 1500 ppm, based on the monomer (mixture).

Initiators that can be used are the cationic initiators usually used in preparation of oxymethylene homopolymers or of oxymethylene copolymers. Examples of these are proton acids, e.g. fluorinated or chlorinated alkyl- and arylsulfonic acids, e.g. trifluoromethanesulfonic acid, trifluoromethanesulfonic anhydride, or Lewis acids, e.g. tin tetrachloride, arsenic pentafluoride, phosphorus pentafluoride, and boron trifluoride, and also their complexes, e.g. boron trifluoride etherates, and carbocation sources, e.g. triphenylmethyl hexafluorophosphate.

The amounts usually used of the initiators are from 0.005 to 50 ppm, preferably from 0.01 to 5 ppm, particularly preferably from 0.02 to 2 ppm, based on the monomer (mixture).

After the polymerization, the solid or liquid polymerization mixture is treated in a homogeneous phase with an aprotic solvent which is basic and/or comprises a dissolved base. This rapidly and completely deactivates the catalyst and/or active polymer chains remaining present in the reaction mixture after the polymerization.

The bases used comprise compounds which lead to termination of the polymerization. Among these are proton acceptors, such as triethylamine, and aprotic solvents having basic action, e.g. dimethylformamide. It is therefore possible to use solely aprotic solvents having basic action as deactivators, or to use aprotic solvents, which are not necessarily basic, in combination with a base dissolved therein. An example of this is a solution of triethylamine in dimethyl sulfoxide or a solution of triethylamine in trioxane.

The treatment with the deactivator solution composed of aprotic solvent and, if appropriate, of a base can take place via isolation of the polymer produced and rapid dissolution in the deactivator solution. The polymer can be deactivated via isolation, after the polymerization, of the oxymethylene homo- or copolymer prepared in step i), for example via cooling of the polymer melt and milling to give powder, followed by dissolution of this powder in the aprotic solvent which is basic and/or which comprises a dissolved base. In another variant of the process, the hot precipitation polymer can be introduced into the aprotic solvent which is basic and/or which comprises a dissolved base.

It is preferable that the polymer precipitated during the polymerization is melted via temperature increase and that the resultant homogeneous phase is treated with the deactivator solution. In this preferred variant of the process, deactivation of the polymer takes place via direct treatment of the oxymethylene homo- or copolymer prepared in step i) after the polymerization, by using heat to melt the hot precipitation polymer and treating it with the aprotic solvent which is basic and/or which comprises a dissolved base.

The inventive process preferably comprises, between steps i) and ii), a step ia) in which the reaction mixture, if appropriate together with an aprotic solvent for the polymer, is heated so as to produce a homogeneous mixture. The heating can take place via heating of the deactivator vessel and/or via feed of a hot deactivator solution.

The proportion of solvent has to be selected to be sufficient to achieve a homogeneous phase at the temperatures and pressures of the deactivation step. At least 10% by weight of solvent is typically required, based on the weight of polymer, preferably from 20 to 80% by weight.

Typical deactivation temperatures vary in the range from 120° C. to 200° C., preferably from 130° C. to 160° C.

Typical deactivation pressures vary in the range from 1 to 500 bar, preferably from 1 to 50 bar.

Examples of solvents for the deactivation step are polar and aprotic solvents, such as dimethylformamide, dimethylacetamide, dimethyl sulfoxide, or cyclic acetals, dioxolane, and in particular trioxane.

The solvent itself can be basic or comprises a dissolved base, preferably primary, secondary, or in particular tertiary amines.

It is particularly preferable to use an aprotic organic solvent, in particular trioxane, which comprises an amine, preferably a tertiary amine, very particularly preferably triethylamine, or which comprises a primary amine, preferably melamine.

Polymerization and deactivation can take place in the reactors known for the preparation of POM homo- or copolymers. Those typically used comprise kneaders, extruders, or preferably tubular reactors designed with static mixers, these being designed to be temperature-controllable and pressure-resistant.

Steps i) and ii) are preferably carried out at elevated temperatures and pressures.

It is particularly preferable that steps i) and ii) are executed in two reactors arranged in series.

The polymerization time can vary widely and typically varies in the range from 10 seconds to 2 hours, preferably from 15 seconds to 1 hour, and particularly preferably from 20 to 50 seconds.

The actual deactivation occurs in an instant and has been completed with the homogeneous mixing of the components. The period required for homogenization is typically in the range from 5 seconds to 5 minutes.

Parallel with the deactivation of the initiators and/or of the active polymer chains, further stabilization of the crude (co)polymer obtained can also take place. In the case of the homopolymers, no further capping of reactive end groups is generally required. However, a further etherification or esterification with suitable capping agents for example can take place in order to cap small proportions of reactive end groups in the polymer. In the case of the copolymers, stabilization can take place via controlled degradation of the polymer chains produced as far as a stabilizing monomer unit. These measures are known per se.

Particular preference is given to a process in which no additional measures are undertaken for chain capping, e.g. esterification or etherification of the chain ends.

After the deactivation reaction and, if appropriate, the stabilization of the polymer, these can be transferred to a depressurization zone for removal of residual monomers and of solvent, and a reduced pressure is applied to remove residual monomers and to remove solvent. They may also be removed in a plurality of stages, and the first stages here can also be operated at above atmospheric pressure.

The depressurization zone is formed by a space which is filled by the hot polymer solution. Application of subatmospheric pressure, preferably a pressure less than 500 mbar, in particular less than 200 mbar, extracts most of the remaining monomer residues and remaining solvent residues from the polymer solution by utilizing its temperature. This step of the process can be carried out in a separate portion of the tubular reactor, preferably in an extruder. However, it is also possible to use other assemblies, e.g. a flash chamber. In the case of pressurized polymer solutions, these are first depressurized to ambient pressure in the depressurization zone before the residual monomers are extracted by suction.

To this end, the polymer solution is preferably transferred, after step ii), while maintaining the pressure, to an extruder in which depressurization and suction to extract the monomer residues and solvent residues takes place.

A twin-screw extruder is particularly preferably used.

Stabilizers and processing aids (hereinafter also termed additives) can, if appropriate, be incorporated into the polymer while it is still in the depressurization zone. The selection of these additives is to be such that the subsequent extraction stage does not remove them from the polymer.

In one preferred variant of the inventive process, after the removal of the monomer residues and solvent residues, a mixture of additives is metered into the extruder and incorporated into the hot polyoxymethylene homo- or copolymer.

Components that can be used in the mixture of additives are the compounds conventionally used for stabilization and/or modification of oxymethylene polymers.

By way of example, these are antioxidants, acid scavengers, formaldehyde scavengers, UV stabilizers, or heat stabilizers. The mixture of additives can comprise, alongside these, processing aids, such as coupling agents, lubricants, nucleating agents, mold-release agents, fillers, reinforcing materials or antistatic agents, or else additives which give the molding composition a desired property, e.g. dyes and/or pigments and/or impact modifiers and/or additives conferring electrical conductivity; or else a mixture of these additives, without restricting the scope to the examples mentioned, however.

Once the monomer residues and solvent residues have been extracted in the depressurization zone, the polymer melt is solidified. This can take place within the depressurization zone or immediately after discharge from the same. The solidified polymer, if appropriate comprising additives, is then pelletized in a manner known per se.

Remaining residual monomers and/or oligomers and/or solvents and/or other contaminants can be removed from the polymer in an extraction stage.

Pelletization and extraction can take place in assemblies known per se.

The extraction stage is preferably followed by a drying process, in order to free the pellets from residues of adherent extractant.

The polymer can then, if appropriate, be provided in a known manner with additives. In this stage of the process, it is also possible to add additives which would be dissolved out of the polymer in the extraction stage.

FIG. 1 shows one preferred variant of the inventive process.

This shows a first reactor (1), a second reactor (2) installed downstream of the first, and a third reactor (3) installed downstream thereof.

A mixture composed of monomer which forms —$CH_2$—O— groups, preferably trioxane, together with an acetal of formaldehyde (4), preferably methylal, and with an initiator of the cationic polymerization (5), is introduced into the first reactor (1). The precipitation polymerization takes place in the first reactor (1), for example at temperatures of 80° C. and pressures of from 1 to 10 bar. The average residence time of the reaction mixture in the first reactor is about 30 seconds. The reaction mixture is then transported into the second reactor (2). An amine (6), if appropriate dissolved in trioxane, is added to the reaction mixture. The trioxane content in the second reactor (2) is set in such a way as to be at least 10% by weight, based on the polymer. The reaction mixture is heated in the second reactor (2), for example at temperatures of 150° C. The average residence time of the reaction mixture in the second reactor is likewise about 30 seconds. The pressure conditions and temperature conditions in the reactor result in formation of a solution of the polymer in trioxane. The reaction mixture is then transported into the third reactor (3). Trioxane, monomer residues and, if appropriate, other volatile constituents (7) are drawn off here from the reaction mixture. This takes place in a plurality of stages in the embodiment shown. The additives described above can be added (not shown) to the POM in this reactor. A stream (8) of the final product is discharged from the reactor.

FIG. 1 therefore describes a preferred process which comprises the following steps:
  a) trioxane, methylal, and, if appropriate, dioxolane are used as initial charge in the form of a solution in a first reactor,
  b) the polymerization is initiated via addition of an initiator for cationic polymerization at pressures and temperatures such that the resultant polymer precipitates from the reaction mixture,
  c) the reaction mixture comprising the precipitated polymer is transferred from the first reactor to a second reactor, and here
  d) a base and, if appropriate, trioxane and/or dimethylacetamide comprising a base dissolved therein is added to the reaction mixture so that the content of trioxane and, if appropriate, dimethylacetamide in the second reactor is at least 10% by weight, based on the polymer,
  e) the reaction mixture is heated in the second reactor to a temperature such that the polymer dissolves,
  f) the reaction mixture is discharged from the second reactor, and
  g) the deactivated polymer is freed from the trioxane and of any dimethylacetamide present.

The inventive processes can produce oxymethylene homo- and copolymers having stabilization by ether end groups and having extremely high thermal stability.

These polymers are considerably stabler than the polymers described in U.S. Pat. No. 3,161,616. It is assumed that the inventive process involving direct introduction of ether end groups results in a further improvement in polymer stability.

The invention therefore also provides oxymethylene homopolymers which have, if appropriate, up to 0.5% by weight of copolymerized oxyethylene units and/or up to 1% by weight of copolymerized branching agents, in which at least 95% of all of the end groups, preferably at least 99% of all of the end groups, and in particular at least 99.9% of all of the end groups, are alkoxy radicals, and where the decomposition rate of the oxymethylene homopolymers, measured at 222° C., is less than 0.005% by weight/minute, preferably less than 0.001% by weight/minute.

The decomposition rate is measured as described in U.S. Pat. No. 3,161,616. The thermal decomposition of the polymer is therefore determined under an inert gas at 222° C., and can be approximated as a first-order reaction.

The constant from the differential equation $$-dw/dt = k \cdot w$$

is used as decomposition rate k. In this equation, w is the weight of polymer not decomposed after expiry of time t.

Particularly preferred polymers have at least 99%, based on all of the end groups, in particular at least 99.9%, of alkoxy radicals as end groups, preferably methoxy radicals.

The decomposition rate, measured at 222° C., of very particularly preferred oxymethylene polymers is less than $5 \cdot 10^{-4}\%$ by weight/minute.

The volume melt index MVR of further oxymethylene polymers to which particular preference is given is from 1 to 80 ml/10 min, measured to EN ISO 1133 at 190° C. with a load of 2.16 kg.

The inventively prepared oxymethylene homo- and copolymers can be further processed to give moldings in a manner known per se via molding processes, e.g. via blow molding, injection molding, or extrusion.

A feature of the particularly preferred oxymethylene homopolymers is high chemicals resistance and high thermal stability, and they have excellent impact resistance.

The examples below illustrate the invention but do not restrict it to these embodiments.

INVENTIVE EXAMPLES 1-4 AND COMPARATIVE EXAMPLE C1

100 parts by weight of trioxane were mixed with the proportions of methylal stated in the table. 100 g of this mixture were placed in a dried aluminum tube whose temperature was controlled to 80° C. The tube was sealed and heated in a water bath at a temperature of 80° C. for a period of 10 minutes. 0.1 ppm of trifluoromethanesulfonic acid (based on trioxane) in the form of a 0.1 percent by weight solution in diethyl glycol dimethyl ether was then added by means of a syringe. The polymerization solution was vigorously shaken until the polymerization reaction began. Once the reaction mixture had solidified, the aluminum tube was kept for a further 30 minutes at the reaction temperature of 80° C. The specimen was then cooled and comminuted and dissolved in dimethylacetamide comprising 1000 ppm of triethylamine. Once the solvent had been evaporated in vacuo, the MVR of the resultant POM homopolymer was determined. It was measured to DIN ISO 1133 at 190° C. with an applied weight of 2.16 kg.

In the comparative experiment, the polymer was treated by boiling in methanol instead of dissolution in dimethylacetamide.

The amounts of chain-transfer agent used and the results of MVR determination are shown in the table below. It is seen that the molecular weight of the polymer produced can be controlled via the amount of chain-transfer agent, and that deactivation with a protic solvent leads to considerable degradation of the molecular weight of the polymer.

| Example No. | Methylal (ppm) | MVR (ml/10 min) |
|---|---|---|
| 1 | 700 | 1.35 |
| 2 | 1000 | 3.56 |
| 3 | 1500 | 6.16 |
| 4 | 2000 | 20 |
| C1 | 1000 | 20 |

INVENTIVE EXAMPLE 5

The decomposition rate of the polymer from inventive example 2 was determined at 222° C. under inert gas. The weight loss was 145 ppm/h.

The invention claimed is:

1. A process for preparation of oxymethylene copolymers containing the structural units of the formula II and III, and also end groups of the formula IV

or containing the structural units of the formula II and V, and optionally formula IV, and also end groups of the formula IV

in which $R^1$ is an alkyl radical,
m is a whole number from 1 to 1000,
o is a whole number from 2 to 6,
p is a whole number from 3 to 6, and
$R^3$ is a p-valent organic radical
encompassing the following measures:
   i) heterogeneous polymerization of a monomer which forms —$CH_2$—O— units and simultaneously of a monomer which forms —O—$C_oH_{2o}$— units, in the presence of an acetal of formaldehyde and of an initiator for cationic polymerization, or heterogeneous polymerization of a monomer which forms —$CH_2$—O— units and simultaneously of a monomer which forms —O—$(R^3$—$O)_p$— units and, optionally simultaneously of a monomer which forms —O—$C_oH_{2o}$— units, in the presence of an acetal of formaldehyde and of an initiator for cationic polymerization, wherein the heterogeneous polymerization is a precipitation polymerization conducted at a temperature from 70 to 120° C. and a pressure from 0 to 10 bar, and
   ii) deactivation of the initiator and/or of the active polymer chains by using an aprotic solvent which is basic and/or which comprises a dissolved base, the aprotic solvent added in an amount of at least 10% by weight, for treatment in a homogeneous phase of the polymer prepared in step i), wherein deactivation is conducted at a temperature from 130 to 160° C.

2. The process as claimed in claim 1, wherein formaldehyde or trioxane is used as monomer which forms —CH$_2$—O— units.

3. The process as claimed in claim 2, wherein, as acetal of formaldehyde, a compound of the formula VI is used

(VI)

in which R$^1$ and R$^2$, independently of one another, are alkyl radicals, and q is a whole number from 1 to 100.

4. The process as claimed in claim 3, wherein, as acetal of formaldehyde, a compound of the formula VI is used in which q=1.

5. The process as claimed in claim 1, wherein, as initiator for cationic polymerization, a Lewis acid, a Brönsted acid or a carbocation source is used.

6. The process as claimed in claim 1, wherein the oxymethylene copolymer prepared in step i) is cooled after the polymerization, and is milled to give powder, and wherein the powder is dissolved in the aprotic solvent which is basic and/or which comprises a dissolved base.

7. The process as claimed in claim 1, wherein, between steps i) and ii), the oxymethylene copolymer prepared is melted via heating in a step ia) and the resultant homogeneous mixture is treated with the aprotic solvent which is basic and/or which comprises a dissolved base.

8. The process as claimed in claim 1, wherein the oxymethylene copolymer prepared in step i) is dissolved directly after the polymerization in the form of hot precipitated polymer in the aprotic solvent which is basic and/or which comprises a dissolved base.

9. The process as claimed in claim 1, wherein, as aprotic solvent, trioxane is used which comprises an amine.

10. The process as claimed in claim 1, wherein, as aprotic solvent, dimethylacetamide is used which optionally comprises an amine.

11. The process as claimed in claim 1, wherein steps i) and ii) are conducted in two reactors arranged in series and between these steps the unreacted residual monomers are permitted to remain in the reaction mixture or are withdrawn from the reaction mixture only to an extent of at most 50% by weight based on the content of the remaining residual monomers in the reaction mixture.

12. The process as claimed in claim 11, wherein, between steps i) and ii), the residual monomers are permitted to remain in the reaction mixture or are removed to an extent of at most 20% by weight between steps i) and ii) from the reaction mixture, and wherein steps i) and ii) are carried out at elevated pressure.

13. The process as claimed in claim 1, which includes no additional measures for chain capping.

14. The process as claimed in claim 1, wherein
a) trioxane, methylal, and optionally dioxolane or 1,3-dioxepan are used as initial charge in the form of a solution in a first reactor,
b) the polymerization is initiated via addition of an initiator for cationic polymerization at pressures and temperatures such that the resultant polymer precipitates from the reaction mixture,
c) the reaction mixture comprising the precipitated polymer is transferred from the first reactor to a second reactor, and here
d) a base and optionally trioxane and/or dimethylacetamide comprising a base dissolved therein is added to the reaction mixture so that the content of trioxane and optionally dimethylacetamide in the second reactor is at least 10% by weight, based on the entire mixture,
e) the reaction mixture is heated in the second reactor to a temperature such that the polymer dissolves,
f) the reaction mixture is discharged from the second reactor, and
g) the deactivated polymer is isolated via removal of the trioxane and of any dimethylacetamide present.

15. The process as claimed in claim 9, wherein the amine is triethylamine.

16. The process as claimed in claim 1, wherein the aprotic solvent is added in an amount of from 20 to 80% by weight.

* * * * *